Sept. 10, 1957    J. H. KYLE    2,805,841
COOLING SYSTEM FOR CONVEYORS
Filed April 4, 1956
Fig. 1
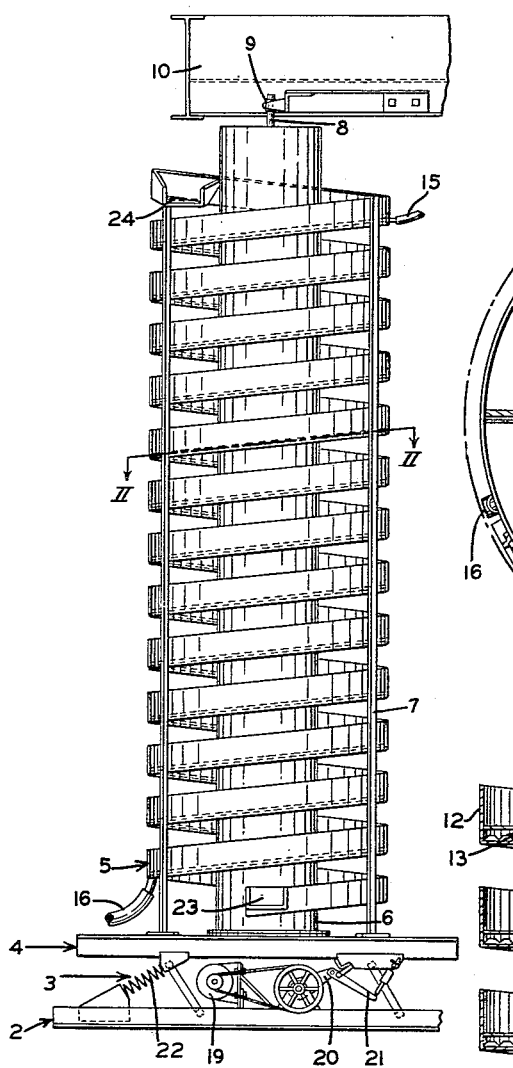
Fig. 2
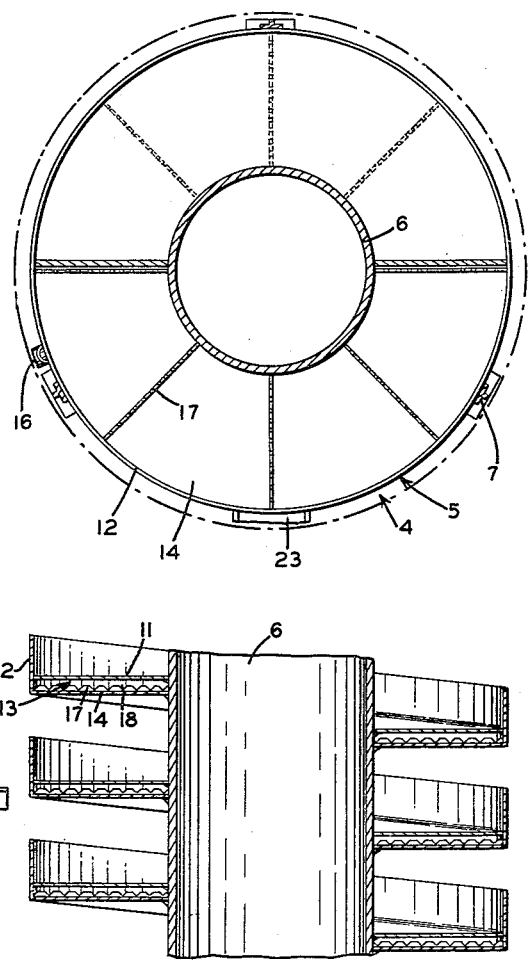
Fig. 3
INVENTOR
JOSEPH H. KYLE
ATTORNEY

United States Patent Office 2,805,841
Patented Sept. 10, 1957

2,805,841

COOLING SYSTEM FOR CONVEYORS

Joseph H. Kyle, Lancaster, Pa., assignor to Armstrong Cork Company, Lancaster, Pa., a corporation of Pennsylvania Application April 4, 1956, Serial No. 576,012

3 Claims. (Cl. 257—120)

This invention relates to an oscillating conveyor and is concerned more particularly with the problem of heat transfer with respect to materials moving along conveyors of this type.

Oscillating conveyors are frequently used in industry to convey from one station to another materials such as plastic granules or chips used in the manufacture of floor and other surface coverings. It is very often necessary or desirable to effect heat transfer at the conveying surface as, for example, to cool the granules or chips being conveyed. This problem of heat extraction from materials being conveyed is particularly acute in so-called spiral or helical oscillating conveyors where material is elevated vertically from a lower level to an upper level by oscillatory movement of a conveyor flight defining an upwardly ascending helical path. It is difficult to use conventional spray cooling arrangements in a helical conveyor of this sort, for it requires that the closed chamber disposed below the helical flight of the conveyor be large enough to install and service the spray nozzles. A deep chamber decreases the usable height of the helical flight for conveying purposes and increases the weight of the conveyor, a factor of some significance in oscillating conveyors.

An object of the present invention is to provide an oscillating conveyor with an arrangement for effecting heat transfer at the conveying surface.

Another object of the invention is to provide a helical oscillating conveyor with a built-in heat transfer arrangement requiring a heat transfer liquid chamber of minimum height.

Other objects of the invention will be clear from consideration of the following detailed description of an embodiment of the invention which is illustrated in the attached drawing, in which:

Figure 1 is a side elevational view showing a typical helical oscillating conveyor embodying the invention;

Figure 2 is a sectional view taken along the line II—II of Figure 1 to an enlarged scale; and Figure 3 is a vertical sectional view of a portion of the conveying flight and heat transfer fluid chamber as shown in Figure 2.

Referring to the drawing, the conveyor includes a base frame 2 upon which is disposed an auxiliary mechanism 3 which drives a conveyor mounting frame 4.

The conveyor 5 is disposed on the mounting frame 4 and is supported by a vertical column 6 and channel member 7 which are secured to the frame 4. The upper end of the column 6 is closed and receives a shaft 8 which is pivoted through a bearing member 9 mounted on the upper framework 10, as shown in Figure 1.

The conveyor 5 may be formed of a helically disposed flight or conveying surface 11 and a side wall member 12. The flight 11 is preferably welded to the column 6 and to the side wall member 12 to form a rigid structure.

A heat transfer chamber 13 is provided which may be formed by welding a helically disposed plate 14 to the column 6 and to the side member 12. Or, if preferred, the side wall member 12 may be bent to the desired shape to provide the bottom wall 14. The top of the chamber is defined and closed by the flight 11. As seen in Figure 3, this provides a relatively shallow chamber which extends in a helical path below the conveyor flight. Preferably, the chamber is coextensive with the major portion of the conveyor flight, but it is obvious that it may extend along a portion only of the flight, depending upon the heat transfer requirements for any particular material to be conveyed.

Heat transfer liquid, such as water, or brine, or other transfer liquid, is inletted into the chamber 13. This is accomplished in the conveyor as shown in the drawing by an inlet pipe 15 disposed adjacent to the top of the conveyor. The spent heat transfer liquid is discharged from the chamber through an outlet or discharge pipe 16. The liquid flows by gravity along the helical path of the heat transfer chamber, and thus it is necessary merely to inlet the heat transfer liquid at the top of the chamber and discharge it from the bottom of the unit, as shown in Figure 1. If desired, the chamber may be closed and a circulation pump provided so that the spent heat transfer liquid may be returned to a suitable heat exchanger where the heat transfer liquid may be reconditioned and returned to the system through the inlet pipe 15.

For efficient heat transfer with a heat transfer liquid, it is desirable to effect a washing or so-called scrubbing action of the liquid against the surface of the flight 11. This may be accomplished by providing a plurality of baffles 17 along a helical path of the liquid flowing by gravity through the chamber 13 from the inlet 15 to the outlet 16. As shown in Figure 3, the baffles may be in the form of serrated sheet metal members, directed generally radially of the helical chamber and welded to the bottom wall 14 of the chamber. Preferably, the notches 18 between the projecting teeth of the baffles extend almost to the bottom wall 14 to provide the desired gravity flow of heat transfer liquid along the chamber with the teeth serving to impart the desired splashing action, causing the liquid flowing along the chamber to impinge upon the lower surface of the flight 11. An excellent washing action is achieved which results in good heat transfer from or to the surface of the flight 11. As shown in Figure 2, there may be eight baffles provided for each turn of the helical flight. The number of baffles employed, their size, shape, and disposition within the chamber 13 will depend upon the heat transfer liquid employed, the amount of heat to be transferred, and other variable factors.

It will be clear from the foregoing description that the heat transfer liquid does not fill the chamber 13 and thus does not constitute a "dead weight" in the system. The liquid may be considered as "conveyed weight" which does not adversely affect the proper operation of the conveyor.

Any conventional oscillating arangement may be provided for effecting the desired motion of the conveyor. In the embodiment chosen for illustration, the unit includes a motor 19, eccentric drive 20, and a linkage arrangement 21, together with reaction springs 22. There are many oscillating systems which may be substituted for the one diagrammatically shown in Figure 1. The present invention is not concerned with any particular mechanism for imparting the oscillatory motion to the unit.

While the drawing illustrates a vertical spiral or helical oscillating conveyor, it is obvious that the invention is applicable to inclined and other oscillating conveyors. The term "flight" is used to include the various troughs, decks, pans, and similar structures used in oscillating conveyors.

In the operation of the unit, material to be conveyed may be fed into an inlet 23 at the bottom of the conveyor, with the oscillating unit in operation. Typically, the material may be particles of a vinyl plastic floor covering mix at a temperature higher than desired, and heat is to be extracted from the particles as they move along the conveyor from the inlet 23 to a discharge chute 24 at the top of the conveyor. For this service, cooling water at about 50° to 60° F. will be satisfactory and will be inletted through pipe 15 at the top of the conveyor. The water will flow by gravity down the helical chamber 13 and will be continuously splashed against the lower surface of the flight 11 upon which the particles periodically come to rest as they are oscillated and moved upwardly along the helical path of the conveyor flight. The reduction in the temperature of the granules as discharged from the chute 24 will depend upon the area of the flight, the quantity of material being conveyed, and other variable factors.

Instead of applying cooling liquid to the chamber 13, heating fluid such as hot water, heated oil, or other transfer liquid may be used and the temperature of the material moving along the conveyor may be increased by absorption of heat from the flight 11.

I claim:

1. In an oscillating conveyor, the combination of an inclined conveyor flight which constitutes a support for material to be conveyed, an inclined chamber disposed below and attached to said flight with said flight forming an upper wall of said chamber, inletting means for introducing a heat transfer liquid into said chamber at a point above the lower end of said chamber for gravity flow therealong, exhaust means for discharging heat transfer liquid from said chamber at a point below said inlet means, means for oscillating said flight and chamber in unison, and means for directing heat transfer liquid in said chamber against the lower surface of said flight with a scrubbing action upon such oscillation comprising a plurality of baffles disposed within said chamber transversely of the path of gravity flow of said heat transfer liquid along said chamber, said baffles projecting upwardly from the bottom wall of said chamber toward said flight and terminating below said flight to permit heat transfer fluid splashed against said flight to pass over said baffles in its travel down said chamber, said baffles having spaced openings therein which extend almost to the bottom wall of the chamber to define the path of gravity flow of heat transfer fluid along the chamber and to establish a body of heat transfer liquid in said chamber of less depth than the depth of said chamber free for splashing against the lower surface of said flight by said baffles upon oscillation of said flight and chamber.

2. In an oscillating conveyor, the combination of a helically directed flight extending along a substantially vertically disposed axis, which flight constitutes a support for material to be conveyed, means for oscillating said flight, a helically disposed chamber disposed below said flight with said flight forming one wall of said chamber, inletting means for introducing a heat transfer liquid into said chamber at a point above the lower end of said chamber for gravity flow therealong, exhaust means for discharging heat transfer liquid from said chamber at a point below said inlet means, means for oscillating said flight and chamber in unison, and means for directing heat transfer liquid in said chamber against the lower surface of said flight with a scrubbing action upon such oscillation comprising a plurality of baffles per turn of said flight, said baffles being disposed substantially radially of said helically directed flight, projecting upwardly from the bottom of said chamber toward said flight, and terminating below said flight to permit heat transfer fluid splashed against said flight to pass over said baffles in its travel down said chamber, said baffles having spaced openings therein which extend almost to the bottom wall of the chamber to define the path of gravity flow of heat transfer fluid along the chamber and to establish a body of heat transfer fluid of less depth than the depth of said chamber free for splashing against said flight by said baffles upon oscillation of said flight and chamber.

3. In an oscillating conveyor, the combination of claim 2 in which said baffles are in the form of upwardly directed, serrated plates.

References Cited in the file of this patent

UNITED STATES PATENTS

| 1,768,156 | Schroder | June 24, 1930 |
| 2,610,033 | Rietz | Sept. 9, 1952 |
| 2,688,807 | Ginther | Sept. 14, 1954 |

FOREIGN PATENTS

| 329,723 | Great Britain | May 29, 1930 |